United States Patent [19]

Parsons et al.

[11] Patent Number: 4,611,800
[45] Date of Patent: Sep. 16, 1986

[54] SHEET SEPARATOR APPARATUS FOR RECIRCULATING FEEDER

[75] Inventors: Michael H. Parsons; James A. McGlen, both of Rochester, N.Y.

[73] Assignee: Eastman Kodak Company, Rochester, N.Y.

[21] Appl. No.: 812,211

[22] Filed: Dec. 23, 1985

[51] Int. Cl.$^4$ .............................................. B65H 5/06
[52] U.S. Cl. ...................................... 271/3.1; 271/189; 271/217
[58] Field of Search ................ 271/3.1, 189, 214, 215, 271/217, 218, 219

[56] References Cited

U.S. PATENT DOCUMENTS

| | | |
|---|---|---|
| 3,556,511 | 1/1971 | Howard et al. |
| 3,556,513 | 1/1971 | Howard |
| 3,565,420 | 2/1971 | Howard |
| 3,782,591 | 1/1974 | Fries |
| 3,815,896 | 6/1974 | Hoyer |
| 3,858,732 | 1/1975 | Kemper |
| 4,043,460 | 8/1977 | Steele |
| 4,076,408 | 2/1978 | Reid et al. |
| 4,164,347 | 8/1979 | McGrain |
| 4,169,674 | 10/1979 | Russel |
| 4,231,562 | 11/1980 | Hori ..................................... 271/3.1 |
| 4,469,320 | 9/1984 | Wenthe ............................... 271/3.1 X |

OTHER PUBLICATIONS

Xerox Disclosure Journal, vol. 5, No. 6, pp. 625-626, Nov./Dec. 1980, "Document Set Separator", James E. Hutton et al.

Primary Examiner—Richard A. Schacher
Attorney, Agent, or Firm—G. Herman Childress

[57] ABSTRACT

A recirculating document feeder for a copier/duplicator removes sheets seriatim from the bottom of a stack of sheets, circulates a removed sheet to a position for copying, and then returns the sheet back onto the top of the stack of sheets. A sheet separator engages the sheet that initially is on top of the stack for separating the sheets in the stack that have been circulated along the path from those sheets in the stack that have not been circulated along the path. In response to feeding of the top sheet of the stack along the path, the separator is retracted and then returned to the top of the stack after the top sheet has been circulated for copying. The separator is driven along a generally rectilinear path and guided along that path by a pin in the separator that travels along a slot formed partially in each of two facing surfaces.

4 Claims, 8 Drawing Figures

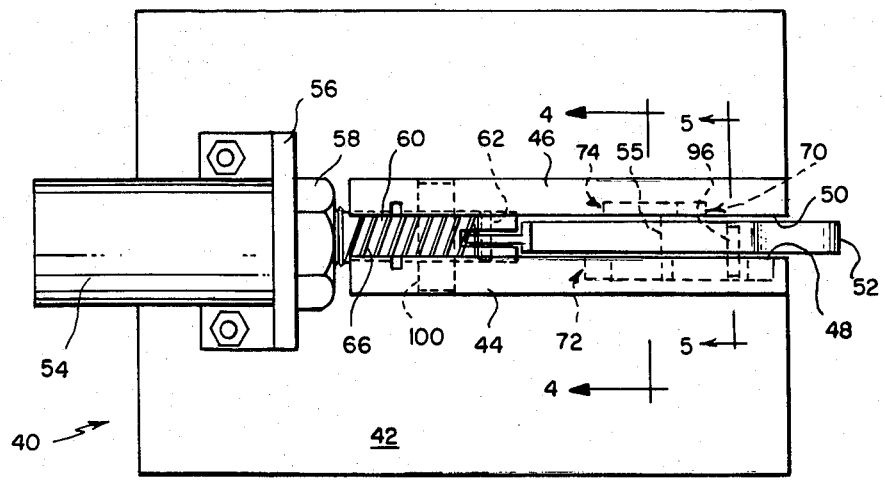
FIG. 2
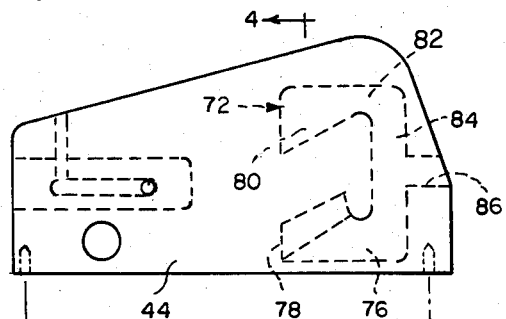
FIG. 3
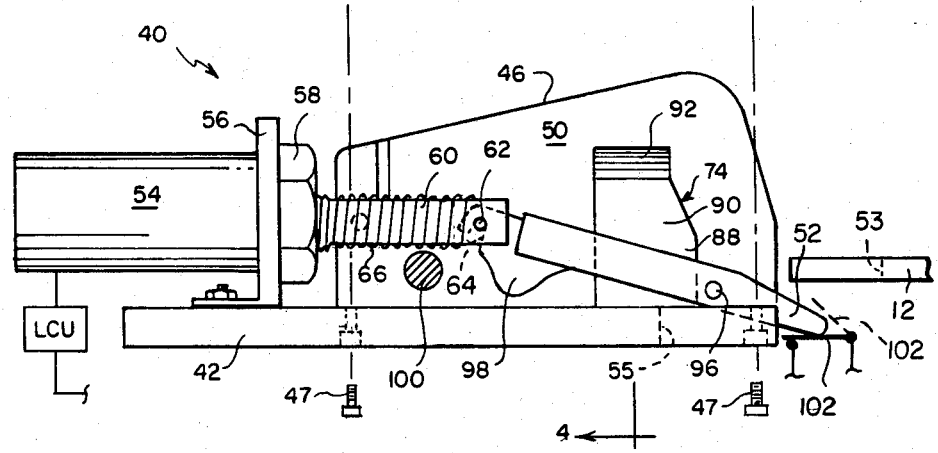

SHEET SEPARATOR APPARATUS FOR RECIRCULATING FEEDER

BACKGROUND OF THE INVENTION

This invention relates to a sheet separator in a recirculating document feeder for a copier/duplicator and, more specifically, to improved apparatus for guiding and driving the separator through its path of travel.

U.S. Pat. No. 4,076,408, issued Feb. 28, 1978, and U.S. Pat. No. 4,164,347, issued Aug. 14, 1979, disclose recirculating document feeders for a copier/duplicator wherein document sheets are fed seriatim along a path leading from the bottom of a stack of such sheets to a copying position and then back to the top of the stack of sheets. The recirculating feeders include a support for holding the stack of sheets and means for feeding the sheets along the path seriatim. A separator is engageable with the sheet that initially is on top of the stack for separating sheets in the stack that have been circulated along the path from those sheets in the stack that have not been circulated along the path. When the sheet that initially is on top of the stack reaches the bottom of the stack and is fed along the sheet path, the separator is returned to the top of the stack so that it again rests on the same sheet at the top of the stack of sheets. The sheet separator in such patents are driven in a rotary path about an axis.

During rotation of the separator back to the top of the stack it actuates a switch which provides a signal to a logic and control unit (LCU) to indicate that the entire set of document sheets has been circulated to the exposure position once. The LCU counts the number of copy sets that have been made and compares that count to the number of such sets requested by the machine operator.

While sheet separators and drives therefore of the type described in such patents have worked satisfactorily, the drive force applied to the separator also is applied to the document sheets. When only a few documents sheets are in the stack, the separator can cause damage to the sheets.

U.S. Pat. No. 4,231,562, issued Nov. 4, 1980, discloses a recirculating document feeder with a sheet separator that is driven through a generally rectilinear guide path by a solenoid that applies a linear force to the separator. One problem with such apparatus is that it requires a pair of springs to assure movement of a guide mechanism for the separator along the desired path. The springs increase the time and cost of assembling the separator. The apparatus of the present invention eliminates the need for the springs, and thus the cost of the springs and the time and cost of assembly of the springs. The present apparatus also requires less force from a solenoid than some prior designs, and is highly reliable.

SUMMARY OF THE INVENTION

It is an object of the invention to provide apparatus for recirculating document sheets as described herein which reduces the likelihood of damage to the document sheets. Another object of the invention is to provide apparatus of the type described which uses a pin-in-slot type arrangement for guiding the separator and wherein the springs used with some previous designs have been eliminated. A further object of the invention is to provide a sheet separator for a recirculating feeder which requires less force from a solenoid to actuate the apparatus and which is highly reliable.

The present invention relates to improvements in apparatus for circulating document sheets seriatim along a path leading from the bottom of a stack of such sheets to a copying position and then back to the top of the stack of sheets. The apparatus has a support for holding the stack of sheets and means for feeding the sheets along the path. A separator is engageable with the sheet that initially is on top of the stack for separating sheets in the stack that have been circulated along the path from sheets in the stack that have not been circulated along the path. In response to feeding of such top sheet along the path, the separator is returned to the top of the stack. More specifically, first and second spaced surfaces are provided adjacent the support. A first portion of the separator is located between the surfaces, and a second portion of the separator is adapted to rest on the top sheet. A force is applied to the first portion of the separator by a drive means to move the separator (1) in a first direction away from the support after the top sheet has been withdrawn from beneath the separator by the feeding means and (2) in a second direction toward the support when the top sheet has been returned to the top of the stack by the feeding means. A guide slot is defined in the surfaces. A first portion of the slot is in the first surface and a second portion of the slot is in the second surface. The first slot portion has a ramp extending from the bottom of the first slot portion toward the second slot portion. The second slot portion has a ramp extending from the bottom of the second slot portion toward the first slot portion. A guide pin mounted on the first portion of the separator has end portions movable along the slot portions. The length of the pin is greater than the spacing between the surfaces and less than the distance between either of the surfaces and the bottom of the portion of the slot in the other surface. The pin is slidable relative to the separator toward and away from the bottoms of the slot portions in response to engagement between the end portions of the pin and the slot ramps during movement of the separator. The pin and slot cooperate during movement of the separator in the first direction to guide the second portion of the separator first away from the support and then upwardly, and the pin and slot cooperate during movement of the separator in a second direction to guide the second portion of the separator toward the support.

BRIEF DESCRIPTION OF THE DRAWINGS

In the detailed description of the preferred embodiment of the invention presented below, reference is made to the accompanying drawings, in which:

FIG. 2 is an enlarged plan view of the separator apparatus of FIG. 1;

FIG. 3 is an elevation view, partly exploded, of the separator apparatus of FIG. 2;

DETAILED DESCRIPTION OF THE INVENTION

Figure 1:
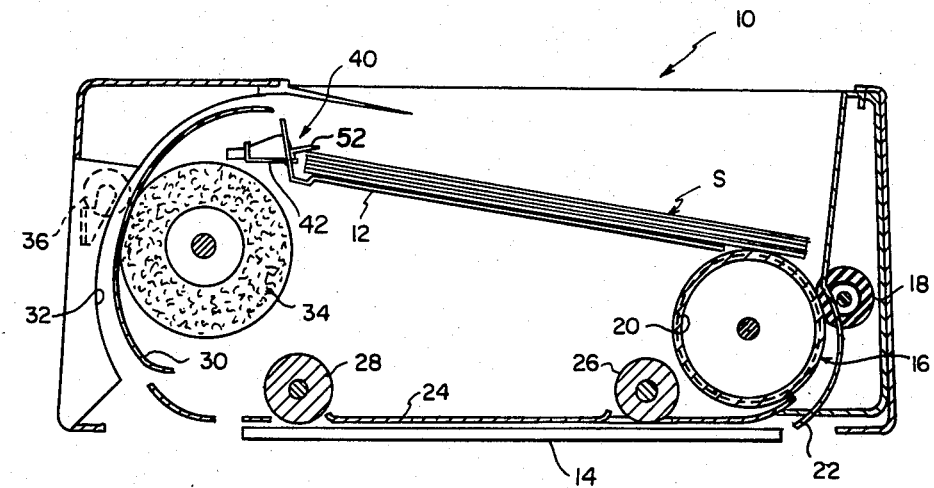
FIG. 1 is a schematic view illustrating a recirculating document feeder incorporating the separator apparatus of the present invention.
Figure 4:
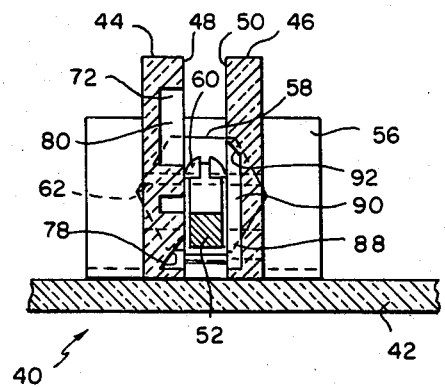
FIG. 4 is a cross-section view taken along line 4—4 of FIGS. 2 and 3.

Referring now to FIG. 1 of the drawings, a recirculating document feeder generally designated 10 has a support 12 for receiving and holding a stack of document sheets S that are to be copied. Feeder 10 can be mounted on a copier/duplicator, for example, having a platen 14 at which document sheets are positioned for copying in a conventional manner and as described in the before-mentioned U.S. Pat. No. 4,076,408. The sheets are circulated seriatim from the bottom of the stack of sheets S on support 12 along a path that leads to a copying position on top of the platen 14 and then back onto the top of the stack of sheets S in the support 12. This may be accomplished, for example, by an oscillating vacuum feeder 16 located beneath the stack of sheets and at one end of the support 12. The oscillating vacuum feeder is effective to pull downwardly on the lower most sheet in the stack S and feed the end of that sheet into a nip between a drive roller 18 and an idler roller 20 recessed into the oscillating vacuum feeder. Roller 18 drives the sheet between the oscillating vacuum feeder and a sheet guide 22 which directs the sheet into a space between the platen 14 and a plate 24 immediately above the platen. The sheet is advanced across the platen by drive rollers 26 and 28. The sheet is stopped on the platen, registered and then illuminated by flash lamps (not shown) for making a copy of the document sheet. Then rollers 26, 28 drive the sheet off of the platen and between guides 30, 32 which direct the sheet back to the support and at an elevation so that the sheet returns to the support on top of the sheets remaining in the support. A sheet can be driven between guides 30, 32 by a roller 34 and a cooperating idler roller 36.

The sheet separator apparatus of the present invention is generally designated 40. As described in more detail later, the separator apparatus 40 includes a separator that is positioned on top of the stack when copying operations begin and rides downwardly with the top sheet of the stack until that top sheet is removed for copying. Then the member is returned again to the top of the stack of sheets after that top sheet is returned to the top of the stack. In this manner, the apparatus 40 detects completion of copying of the set of sheets once.

Referring now to FIGS. 2-8, the preferred embodiment of apparatus 40 comprises a base plate 42 and a pair of guide plates 44, 46. Plate 42 is mounted in feeder 10 adjacent the left end of support 12. The guide plates are perpendicular to the base plate and are located in substantially vertical planes when mounted in the feeder 10. Plates 44, 46 are spaced from each other and have generally parallel inner surfaces 48 and 50, respectively, facing each other. Plates 44, 46 can be secured to plate 42 by screws 47, for example.

Figure 8:
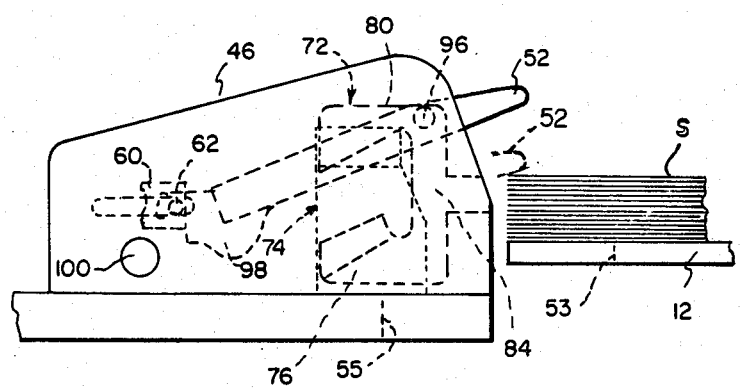

A sheet separator 52 has one end portion located between surfaces 48, 50 of the plates. The other end portion of the separator is adapted to project from the right end of the plates to rest on the sheet on top of the stack of sheets S on support 12 as shown in FIGS. 1 and 8. The projecting end of separator 52 can pass through slot-like openings 53 and 55 in support 12 and plate 42, respectively as explained later.

A solenoid 54 is secured to a mounting plate 56 projecting upwardly from plate 42. The solenoid can be held in place by a nut 58. Solenoid 54 has an armature 60 located between surfaces 48 and 50 of the plates 44, 46.

The outer end of the armature is bifurcated, as best shown in FIG. 2, and a mounting pin 62 extends through the bifurcated end portion thereof. The innermost end of separator 52 is reduced in size and has a slot 64. The reduced end portion of the separator is snapped onto the pin 62 to thereby pivotally connect the separator to the armature. Thus when the solenoid 54 is energized the armature 60 is retracted (moved to the left) to thereby move the separator 52 to the left as viewed in the drawings. A return spring 66 is coiled around the armature 60 and is compressed between the nut 58 and the pin 62. Thus when the solenoid 54 is de-energized the spring 66 urges the armature 60 and separator 52 to the right.

A guide slot generally designated 70 is formed in surfaces 48, 50 of plates 44, 46 respectively. A portion 72 of the slot is formed in surface 48 and a second portion 74 of the slot is formed in surface 50. Referring specifically to FIG. 3, slot portion 72 comprises a first generally horizontal part 76 which extends from the lower right corner of plate 44 toward the left. At the left edge of part 76 there is an inclined ramp 78 that extends from the bottom of slot part 76 to surface 48 of plate 44 and toward the surface 50 of plate 46. Directly above ramp 78, and spaced therefrom, is a first vertical part 80 of the slot portion 72. One end of vertical part 80 is generally above ramp 78 and the left end of slot part 76. A second horizontal part 82 of slot portion 72 extends from the vertical part 80 to the right thereof by a distance sufficient to bring the right end of part 82 directly above the right end of slot part 76. A second vertical part 84 of slot portion 72 extends between the right ends of horizontal parts 82 and 76. Thus, slot portion 72 is substantially continuous from the bottom of part 80 through parts 82, 84, and 76 to the upper end of ramp 78. Slot portion 72 also includes an exit part 86 that extends from part 84 to the right edge of the plate 44 to allow for insertion and removal of a guide pin described later.

Portion 74 of the guide slot in surface 50 includes a relatively wide, horizontal part 88 located near the bottom part of surface 50 and generally facing the ramp 78 and left end portion of part 76 of guide slot portion 72. Portion 74 also comprises a vertical part 90 that extends upwardly and tapers inwardly from slot part 88 and terminates at its upper end in a ramp 92 that extends from the bottom of slot part 90 toward the slot portion 72 in surface 48. Ramp 92 is generally aligned with the part 80 of slot portion 72 whereas part 88 of slot portion 74 is aligned generally with the left end of slot part 76 and ramp 78.

Figure 5:
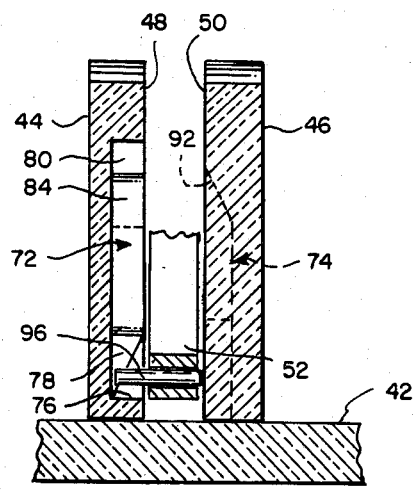
FIG. 5 is a cross section view taken along line 5—5 of FIG. 2.

A guide pin 96 is mounted on the portion of separator 52 that is located between the plates 44 and 46. The end portions of the pin are movable through the slot portions 72 and 74 in the plates for guiding the separator 52 through its various positions as described later. Referring to FIGS. 2 and 5, the length of pin 96 is greater than the spacing between plate surfaces 48, 50 and less than the distance between either of the surfaces and the bottom of the portion of the slot in the other surface. The pin is slidable relative to the separator in the direction generally perpendicular to the length of the separator so that it can move toward and away from the bottom of the slot portions 72 and 74 in response to engagement between the end portion of the pin and the slot ramps during movement of the separator as described later. As the separator is initially positioned between plates 44, 46, the pin projects toward plate 44 and enters the guide slot through part 86 of the slot.

Figure 6:
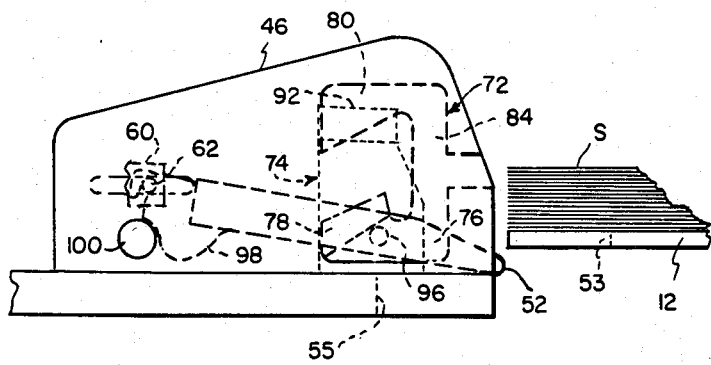
FIGS. 6–8 are views showing three positions of the separator apparatus during circulation of a set of sheets.

The pin 96 and slot 70 cooperate during movement of the separator to guide the projecting end portion of the separator in a generally rectilinear path. Since the solenoid 54 applies a force acting in a generally horizontal direction, means are needed for raising the projecting end portion of the separator horizontally. In the embodiment illustrated in the drawings, this is accomplished by providing a cam 98 (FIGS. 3 and 6-8) and a pin 100. The cam is on the lower surface of the separator near the innermost end thereof, and pin 100 extends between plates 44, 46 and beneath the armature 60 so that it can be contacted by the cam during movement of the separator to the left. Thus, as the armature 60 is retracted when solenoid 54 is energized, the separator 52 is moved to the left from its FIG. 3 position to bring the cam 98 into engagement with the pin 100 as shown in FIG. 6. As the armature continues to move to the left, cam 98 rides up on pin 100 and swings the separator about pin 62 to thereby lift the outermost end of the separator in a vertical direction to the position shown in FIG. 7. When in the FIG. 7 position, the right end of the separator is above the level of the top sheet on support 12.

Preferably, means are provided for sensing when the separator 52 reaches its lowermost position, as occurs when the sheet it is resting on is fed from the support 12 for copying. In the embodiment illustrated in the drawings, this can be accomplished by providing a switch 102 (FIG. 3) which is contacted by the outer end of the separator when it reaches its lowermost position to thereby close the switch. Alternatively, the position of the separator can be sensed optically or by some other means in order to close a switch such as shown in 102. Closing of the switch 102 is detected by a logic and control unit (LCU) of the copier/duplicator which controls operation of the solenoid 54.

Operation of the apparatus of the invention will now be described. When the apparatus is in an inactive condition with no sheets in the support 12 of the recirculating feeder 10, the separator 52 occupies the position illustrated in FIG. 3. The projecting end portion of the separator holds switch 102 closed to provide a signal to the LCU indicating that the separator is at its lowermost position. However, since no sheets are in the feeder for copying, the LCU does not energize the solenoid 54 and the separator remains in this position. At this time, the pin 96 is located relative to the guide slot in surfaces 48 and 50 so that the pin is in the portion of the slot formed in surface 48 and generally at the intersection of slot parts 76 and 84.

Figure 7:
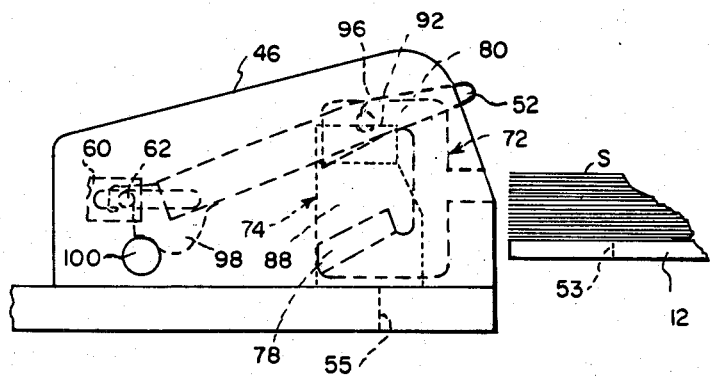

When a machine operator places sheets S to be copied onto the support 12 of the recirculating feeder and initiates operation of the apparatus, the LCU immediately energizes the solenoid 54 to retract the armature 60 and thus move the separator 52 through its FIG. 6 position to its FIG. 7 position. As this occurs, pin 96 moves along guide slot part 76 generally to the position illustrated in FIG. 6. At this time, cam 98 on the bottom of the separator engages the pin 100 extending between the plates 44, 46 to thereby pivot the separator in a counterclockwise direction upwardly about the axis of pin 62, thereby to move the separator to its FIG. 7 position. As this occurs, one end of the pin 96 first engages the ramp 78 of slot portion formed in surface 48. As the pin is moved upwardly with the separator, the pin is forced laterally through the separator by the ramp 78 so that the other end of the pin enters the part 88 and then part 90 of the slot portion 74 in surface 50. As the pin 96 approaches its fully elevated position, the projecting end of the pin strikes the ramp 92 in surface 50, and the ramp is effective to drive the pin laterally with respect to the separator to move the other end of the pin into the part 80 of the slot portion 72 formed in surface 48.

At this time the LCU de-energizes solenoid 54. The armature 60 is extended and the separator 52 is moved to the right by the force of spring 66. However, the separator does not move downwardly through slot part 90 because the pin has been thrust laterally sideways to locate the end of the pin in slot part 80 and the bottom of that slot part limits downward movement of the separator. As armature 60 is extended by the spring, the pin 96 travels from slot part 80 through slot part 82 into the upper end portion of slot part 84. This is the position illustrated in FIG. 8 of the drawings. At this time the pin can drop downwardly through slot part 84 until the projecting end portion of the separator engages and rests on the top sheet of the stack of sheets in the support 12. The only force urging the separator against the sheets is the force of gravity. Since separator 52 is a very light-weight member, the separator will not damage the document sheets.

As is known in the art, during operation of the recirculating feeder, sheets S are removed from the bottom of the stack, fed to the platen 14 for exposure and copying and then returned to the top of the stack on the support 12. As sheets are returned to the stack, they rest on top of the separator 52. Thus, the separator gradually works downwardly with the sheet that was initially on top of the stack of sheets S. When that sheet reaches the bottom of the stack and then is fed from the support 12, the projecting end of the separator can drop through the openings 53, 55 in the bottom of the support 12 and plate 42 to the position illustrated in FIG. 3 where it closes switch 102 to thereby signal the LCU that the entire set of sheets has been circulated once for copying.

After a brief time delay, which allows the top sheet of the stack to be returned from the platen to the top of the sheets in the support 12, the solenoid 54 is again energized to retract the separator 52 and move it through the positions shown in FIGS. 5 and 6. Then the solenoid is de-energized so spring 66 can return the separator through its FIG. 8 position and onto the top sheet in the stack. This process is repeated until the set of sheets on support 12 has been copied the desired number of times. When the set of sheets has been copied for the last time, the separator closes switch 102 to send a signal to the LCU which recognizes that the copying cycle is complete and does not energize the solenoid again.

A number of advantages are achieved by the present invention. First of all, there is only a slight force applied by the separator to the document sheets. Therefore, there is no damage to document sheets, as sometimes occurred with prior rotary separators. In addition, the invention eliminates the need for springs commonly used with pin-in-slot type guide arrangements for moving a separator in a generally rectilinear path. This reduces the expense of the apparatus and simplifies assembly of the apparatus. At the same time, the provision of the guide slot of the invention in the two facing surfaces 48, 50, together with the sliding pin 96 which can travel along the slot portions in either of the surfaces provides the desired positive and controlled movement of the separator in a generally rectilinear manner even through the forces applied by the solenoid 54 and spring 60 are generally horizontal. Moreover, the apparatus is very reliable and requires less force from the solenoid than some prior apparatus.

The invention has been described in detail with reference to a preferred embodiment thereof, but it will be understood that variations and modifications can be effected within the spirit and scope of the invention.

We claim:

1. In apparatus for circulating document sheets seriatim along a path leading from the bottom of a stack of such sheets to a copying position and then back to the top of the stack of sheets, the apparatus having a support for holding the stack of sheets, means for feeding the sheets along the path, a separator engageable with the sheet that initially is on top of the stack for separating sheets in the stack that have been circulated along the path from sheets in the stack that have not been circulated along the path, and means responsive to feeding of said top sheet along the path for returning the separator to the top of the stack, the improvement comprising:

means defining first and second spaced surfaces adjacent the support, a first portion of the separator being located between said surfaces and a second portion of the separator being adapted to rest on said top sheet;

drive means for applying a force to the separator to move the separator (1) in a first direction away from the support after the top sheet has been withdrawn from beneath the separator by the feeding means and (2) in a second direction toward the support when the top sheet has been returned to the top of the stack by the feeding means;

means defining a guide slot in said surfaces, a first portion of the slot being in the first surface and a second portion of the slot being in the second surface, the first slot portion having a ramp extending from the bottom of the first slot portion toward the second slot portion, and the second slot portion having a ramp extending from the bottom of the second slot portion toward the first slot portion; and a guide pin mounted on the first portion of the separator and having end portions movable along the slot portions, the length of the pin being greater than the spacing between the surfaces and less than the distance between either of the surfaces and the bottom of the portion of the slot in the other surface, the pin being slidable relative to the separator toward and away from the bottoms of the slot portions in response to engagement between the end portions of the pin and the slot ramps during movement of the separator, the pin and slot cooperating during movement of the separator in the first direction to guide the second portion of the separator first away from the support and then upwardly, and the pin and slot cooperating during movement of the separator in the second direction to guide the second portion of the separator generally toward the support.

2. The invention as set forth in claim 1 wherein the drive means is pivoted to the separator, and further comprising a cam on the separator, and means between the surfaces engageable by the cam as the drive means moves the separator in the first direction for pivoting the separator and thereby moving the second portion of the separator upwardly.

3. The invention as set forth in claim 1 wherein the first portion of the guide slot comprises (a) a first generally horizontal part with the ramp of the first slot portion being at one end thereof, (b) a first vertical part spaced from the ramp and having one end generally above the ramp, (c) a second horizontal part forming a continuation of the other end of the first vertical portion, and (d) a second vertical part extending between the first and second horizontal parts and spaced from the first vertical part.

4. The invention as set forth in claim 3 wherein the second portion of the guide slot comprises (a) a generally horizontal part generally facing the ramp of the first slot portion, and (b) a vertical part forming a continuation of the horizontal part with the ramp of the second slot portion being at one end thereof and facing the first vertical part of the first slot portion.

* * * * *